Dec. 19, 1939.　　　　C. A. TSCHANZ　　　　2,184,202
STABILIZING SYSTEM FOR VEHICLES
Filed Dec. 28, 1937　　　2 Sheets-Sheet 2
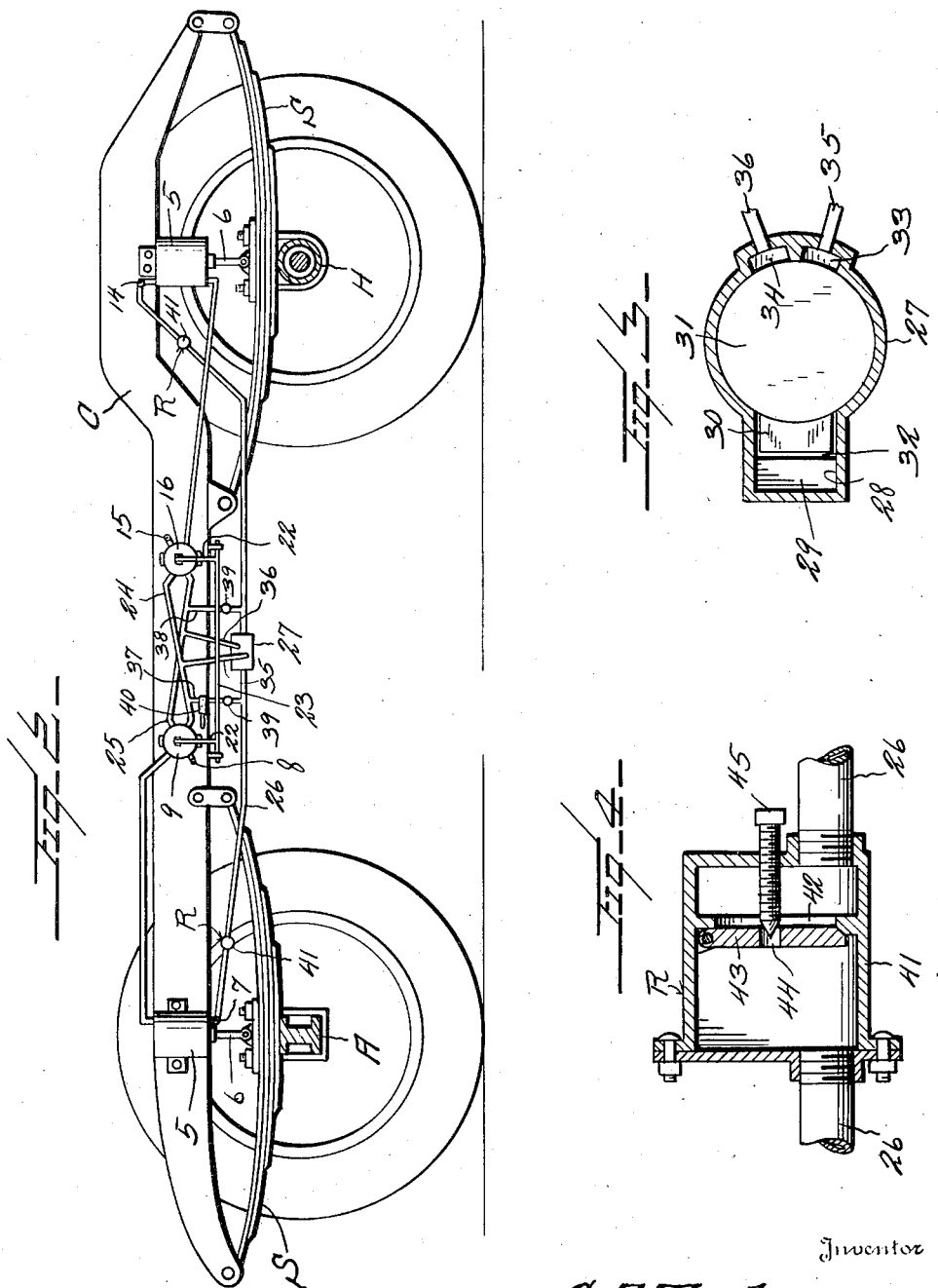
Inventor
C. A. Tschanz
By Watson E. Coleman
Attorney Patented Dec. 19, 1939

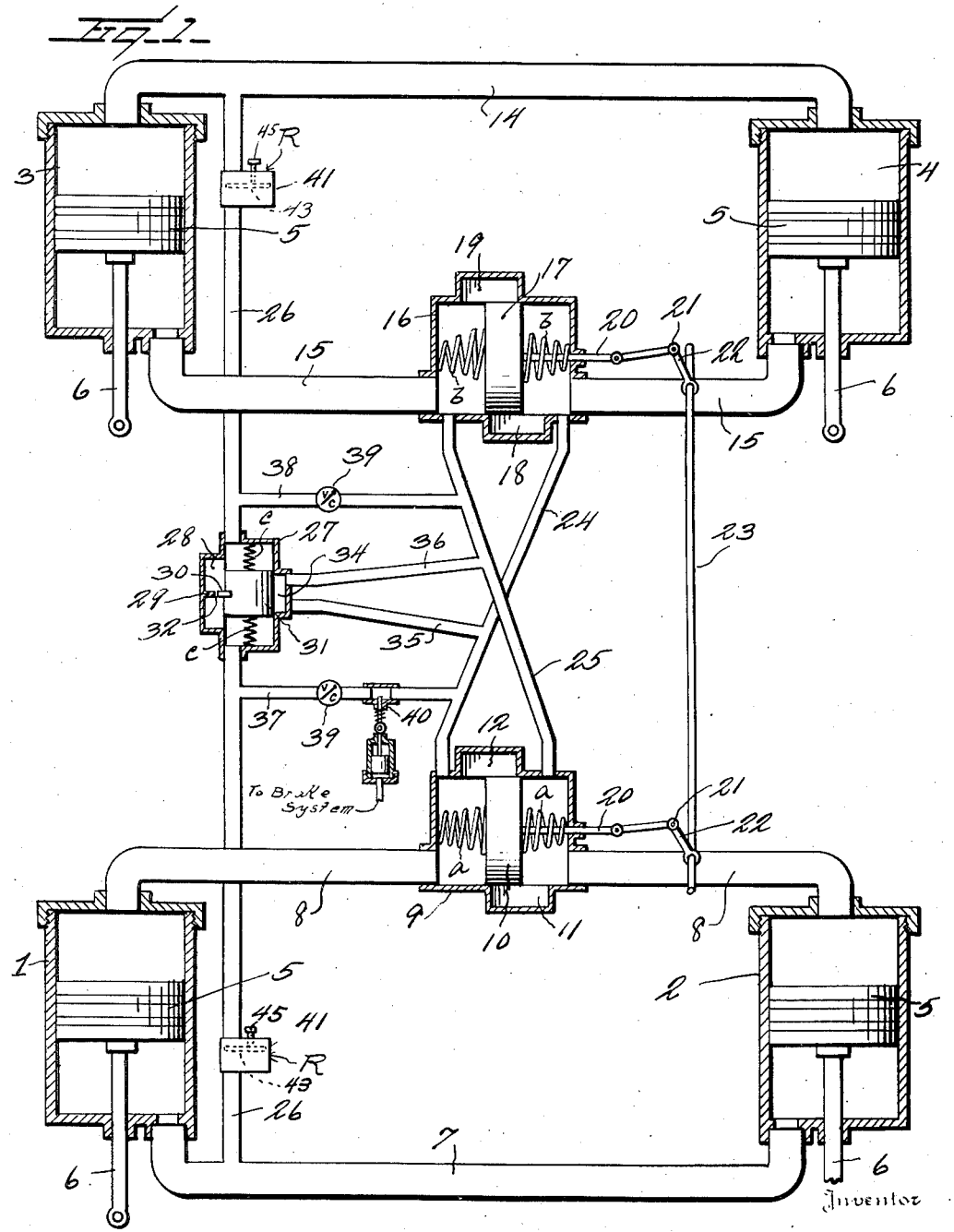

2,184,202

UNITED STATES PATENT OFFICE 2,184,202

STABILIZING SYSTEM FOR VEHICLES

Carl A. Tschanz, Cincinnati, Ohio

Application December 28, 1937, Serial No. 182,074

8 Claims. (Cl. 280—124)

This invention relates to a stabilizing system for vehicles, and it is primarily an object of the invention to provide a system to be employed in connection with a vehicle having spring suspension for the ground engaging members whereby it is possible and of advantage to have the spring suspension less rigid or more responsive than the general type of spring suspension now in use.

The invention also has for an object to provide a hydraulic system wherein is effectively resisted the various movements of the body of the vehicle to insure a maximum of comfort to the occupants when the system is employed in connection with a passenger vehicle, or to reduce to a minimum the liability of breakage or other injury to the load carried by the body when the vehicle is used for the transporting of commodities.

An additional object of the invention is to provide a system of this kind which operates automatically to substantially eliminate traffic strains to which a vehicle is subjected when in transit such as side sway, side pitch and end tilt or longitudinal roll, in addition to preventing any abnormal vertical vibration of the body whereby it is possible to employ a spring suspension of a very flexible character in contradistinction to a relatively stiff spring suspension.

The invention also has for an object to provide a system of this kind which operates to eliminate twists or straining movements of the body resulting from a wheel of the vehicle striking an obstruction when the vehicle is travelling over an uneven surface which would cause the wheels to assume different levels with respect to such surface.

The invention consists in the details of construction and in the combination and arrangement of the several parts of my improved stabilizing system whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein—

Figure 1 is a diagrammatic view illustrating a stabilizing system for vehicles in accordance with an embodiment of my invention;

Figure 2 is a view in side elevation and also of a somewhat diagrammatic character illustrating a stabilizing system constructed in accordance with an embodiment of my invention in applied position upon a vehicle;

Figure 3 is an enlarged fragmentary view partly in section and partly in elevation taken transversely through one of the valve structures herein comprised;

Figure 4 is an enlarged fragmentary view partly in section and partly in elevation taken through one of the resisting valves as herein employed.

As disclosed in the accompanying drawings, C denotes the chassis of a vehicle and which has suspended therefrom through the instrumentality of the spring elements S the conventional housing H or axle A for the front and rear wheel assemblies. It is not believed necessary that a detailed illustration or description be given of these particular parts as they may comprise any preferred structures although it is to be stated that with my improved stabilizing system employed in connection with a vehicle, the spring elements S will be considerably more responsive than the substantially stiff spring elements now generally in use. In referring to the housings H it is to be understood by this that I have in mind any equivalent structure which may be employed in connection with a vehicle, as for example an axle or other part which may be suspended from the chassis C.

Suitably secured to the chassis C fore and aft thereof are the cylinders 1, 2, 3 and 4, the cylinders 1 and 2 being at the front end of the chassis C at opposite sides thereof and the cylinders 3 and 4 being at the rear of the chassis C at opposite sides thereof. Working in these cylinders are the pistons 5 and extending from said pistons are the rods 6. These rods 6 extend beyond their respective cylinders and are operatively connected with the housings H and axles A. Similar ends of the cylinders 1 and 2 are connected by a communicating pipe line 7 while the opposite ends of said cylinders 1 and 2 are connected by the communicating pipe line 8. Interposed in the line 8 is a valve casing 9 in which is mounted for rectilinear movement a valve member 10 normally maintained in central position by the springs $a$. The casing 9 is provided with two bypasses 11 and 12, flow through which is stopped by the valve member 10 when the pistons 5 are in their central or neutral position or when the chassis is free of abnormal movement with respect to the wheel assemblies. At this time it is to be stated that by having a quickly responsive spring assembly the slight or average inequalities in a road surface will be readily absorbed without any particular movement or vibration being transmitted to the chassis.

Similar ends of the cylinders 3 and 4 are connected by the communicating pipe line 14 while the opposite ends of said cylinders 3 and 4 are connected by the communicating pipe line 15. This line 15 also has interposed therein a valve casing 16 in which is mounted for rectilinear movement a valve member 17 with springs b located on both sides thereof to retain valve member 17 in central position when not acted upon. This casing 16 also has two bypasses 18 and 19 normally closed by the valve member 17 as just explained in connection with the valve member 10.

The valve members 10 and 17 carry rods 20 extending outwardly of the casings 9 and 16 and the outer extremities of said rods 20 are operatively connected, as at 21, with rock arms 22 carried by a shaft 23. This shaft 23 is supported in a conventional manner upon the chassis C for rocking movement and this shaft through its operative connection with the rods 20 assures the valve members 10 and 17 moving simultaneously in the same direction and for the same extent of movement which is an important factor in my system as will hereinafter appear.

The bypasses 11 and 12 within the casing 9 and also the bypasses 18 and 19 within the casing 16 extend in opposite directions with the inner end portions thereof in what might be termed overlying relation. The casing 9 beyond the outer end of the bypass 12 has in communication therewith a pipe line 24 which is in communication with the valve casing 16 at a point closely adjacent to but beyond the outer end of the bypass 18. The casings 9 and 16 are also connected by a second pipe line 25 which communicates with the vasings 9 and 16 at the sides of the valve members 10 and 17 remote from the points of communication between the pipe line 24 and the valve casing 16. It is also to be noted that the bores of the lines 24 and 25 are each of a diameter less than the diameter of the bores of the pipes 8 and 15. At this time it is to be stated that the bores of the pipes 7, 8, 14 and 15 are all substantially the same diameter.

The lines 7 and 14 are connected by the communicating pipe line 26, the bore of which is also less than the bores of the lines 7 and 14. Interposed in this pipe line 26 is a valve casing 27 having a central internal bypass 28, the central portion of which is reduced, as at 29. This reduced portion 29 coacts with an outstanding lip or flange 30 carried by the valve member 31 working in the valve casing 27 whereby normally is provided a minute opening 32 in the bypass 28 to permit restricted passage of fluid through said by-pass. Obviously, upon movement of the valve member 31 in either direction there will be a greater flow of fluid as will be later explained. On both sides of valve member 31 are located springs c to hold said member in central position when not moved by pressure.

The valve casing 27 is also provided in its central part with the additional bypasses 33 and 34 which are normally closed by the valve member 31. In communication with the bypass 33 and leading to and in communication with the pipe line 24 is the pipe line 35, and in communication with the bypass 34 and leading to and in communication with the pipe line 25 is the pipe line 36. In communication with the pipe line 26 in advance of the valve casing 27 is a pipe line 37 which also communicates with the pipe line 24 and in communication with the pipe line 26 rearwardly of the valve casing 27 is a pipe line 38 in communication with the pipe line 25. Interposed in each of the pipe lines 37 and 38 is a check valve 39 which operates to prevent flow of fluid through the pipe line 37 or 38 to the pipe line 24 or 25 respectively. The forward pipe line 37 also has interposed therein a valve 40 which is under control of the brake mechanism of the vehicle, that is to say, that when the brake is applied this valve 40 will be moved into closed position and vice versa. The operating means for this valve 40 is only diagrammatically illustrated in the accompanying drawings as I do not at this time wish to limit myself to any particular or specific mechanism for effecting the opening and closing of this valve 40 under the control of the brake.

It is to be stated that my improved system is a filled hydraulic system and the fluid employed may be any kind preferred, it only being required that in the colder climates such fluid be of a non-freezing and non-compressible character.

Normally the various pistons 5 and valve members 10, 17, 31 and 40 are in the positions illustrated in Figure 1 of the accompanying drawings. Should one of the wheels of the vehicle, as for example the front left wheel, strike an abnormal obstruction the piston 5 in the cylinder 2 will be moved inwardly thereof transmitting pressure through the pipe 8 to the cylinder 1 through the bypass 12, it being understood of course that the initial pressure created by the piston 5 will move the valve member 10 a distance sufficient to open the bypass 12 but will not open the bypass 11. Of course, if it should be the right front wheel that hits the obstruction, the piston 5 in the cylinder 1 would move inwardly and create pressure through the pipe line 8 to the cylinder 2 after having first moved the valve member 10 a distance sufficient to open the bypass 11. At the same time one of the pistons 5 moves inwardly of its cylinder the other will move outwardly and, of course, the fluid will also be forced through the pipe line 7 from either the cylinder 2 to the cylinder 1 or from the cylinder 1 to the cylinder 2 in accordance with which one of the front wheels strikes the obstruction.

Due to the permissible use of very flexible spring suspension a wheel may be forced upwardly by a slight obstruction without changing the horizontal plane of the body, for example, when piston 5 in cylinder 1 moves upward or inward fluid is forced through line 8 into valve casing 9 through lines 24, 37, 26 and 7 into lower portion of cylinder 1.

The valve member 17 moves in unison and in the same direction as the valve member 10 and to the same extent. Also when these valve members are in their neutral position either voluntarily or held there by pressure, the bypasses 11, 12, 18 and 19 remain closed. This simultaneous movement of the valve members 10 and 17 is of particular importance and advantage when the vehicle is making a turn. Should the turn be to the left, the tendency of the side sway of the body would be to move the cylinders 1 and 3 downwardly with the resultant forcing of fluid through the pipe line 8 into the valve casing 9 and through the pipe line 14 into the cylinder 4. The tendency of the cylinders 2 and 4 to move upwardly will result in pressure through the pipe line 15 into the valve casing 16 and through the pipe line 7 to the cylinder 1. During this action there will be substantially the same pressure on one side of the valve member 17 as on the opposite side of the valve member 10 and which serves to resist the side sway of the body and thereby maintain it in substantially its normal position. If, however, while making a turn one of the wheels should strike an abnormal obstruction, the further movement of a piston 5, as for example the piston 5 in the cylinder 2, will cause the excess pressure to pass through the pipe line 25 and the line 38 into the pipe line 26 and from there to the pipe line 7 and back to the cylinder 2. At the same time a certain amount of the fluid will pass through the line 25 and through the line 15 to the cylinder 3.

In suddenly starting and stopping a vehicle there is often a tendency for the chassis to jump. With my improved system if upon starting of the vehicle there is any such jumping of the chassis the relative movement of the cylinders 1 and 2 with respect to the pistons 5 therein will create pressure from both of the cylinders 1 and 2 through the pipe line 7 and through the line 26 to the valve casing 27. At the same time the relative movement of the cylinders 3 and 4 with respect to the pistons 5 therein will create pressure through the pipe line 14 and through the line 26 to the opposite end of the valve casing 27. Under this starting action the pressure will be substantially uniform against both ends of the valve member 31, thereby maintaining the same in its normal or neutral position and thus resisting the tendency of the jumping movement of the body. As before stated, when in this normal position the valve member 31 closes the pipe lines 35 and 36 and, of course, flow through the lines 37 and 38 is prevented by the check valves 39.

However, in stopping a vehicle, the pressure will be from the cylinders 1 and 2 through the pipe lines 24 and 25 and at the same time there will be pressure from the cylinders 3 and 4 and through the pipe line 15 and into the pipe lines 24 and 25. With application of brake, valve 40 is closed to prevent flow of fluid out of the line 24 through line 37 into line 26. While fluid may also pass through the pipe line 38 into the line 26 this is of no disadvantage as the chassis will be effectively held against longitudinal roll during the stopping movement. In other words, I want to make it clear that it is not necessary that a second valve be placed in the line 38 to close with the application of the brake as has been stated in connection with the valve 40.

If either of the front wheels should have impact with an obstruction to result in an unusually high pressure, the excess of such pressure, if from the cylinder 2, will pass through the line 25 and the line 38 to the line 26 and force the valve 31 a distance sufficient to enlarge the opening 32 so that the fluid may readily flow on through the pipe line 26 to the line 7. Should the excess pressure be from the cylinder 1, such pressure will pass up through the pipe lines 24 and 37 to the pipe line 26 and through the pipe line 26 to the pipe line 7. Should either of the rear wheels strike an obstruction with a resultant high or excessive pressure, the excess pressure from the cylinder, as for example 4, will pass through the pipe line 14 and through the pipe line 26 to the casing 27 moving the valve member 31 a distance sufficient to open the bypasses 33 and 34 so that said excess pressure of fluid may pass through the pipe line 35 to the line 24 through the pipe line 15 and from the line 15 to the cylinder 4. The fluid passes through this pipe line 35 as it takes the course of least resistance as the fluid in the line 36 is under resisting pressure. Should the excess pressure come from the cylinder 3 fluid will pass through the line 14 and line 26 forcing the valve member 31 a distance to open the bypasses 33 and 34 but the fluid will only pass out through the line 36 to the line 25 as the fluid in the line 35 is also under resisting pressure.

There may be interposed in the line 26 at opposite sides of the casing 27 resisting valves R. Each of these valves operates to resist the flow of fluid when the springs make a rebound. The flow will be from the casing 27 when the rear springs are on the rebound but when the front springs are on the rebound the flow will be toward the casing 27. Each of the resisting valves R, as illustrated, comprises a casing 41 having an internal valve seat 42 with which coacts a flap valve member 43. This valve member permits free flow in one direction but closes upon rebound. It is necessary, however, that a reduced flow be permitted when the valve member 43 holds to its seat. For this purpose the member 43 has a restricted port 44 and when member 43 is seated flow through the port 44 is regulated by the needle valve 45.

From the foregoing description it is thought to be obvious that a stabilizing system constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. In combination with a chassis, a front running gear, a rear running gear, and suspension springs interposed between the gears and the chassis; a hydraulic stabilizing system comprising a pair of front transversely spaced cylinders, pistons working therein, a pair of rear transversely spaced cylinders, pistons working in said rear cylinders, said pistons and cylinders being operatively engaged with the chassis and the running gears, a line connecting each pair of cylinders upon corresponding sides of the pistons, a second fluid line connecting each pair of cylinders at the opposite sides of the pistons, a valve casing interposed in the second-mentioned line connecting the cylinders of one pair, a valve casing in the first-mentioned line connecting the other pair of cylinders, each of said valve casings having two bypasses, a valve member in each of the casings normally in a position to close both of the bypasses against flow therethrough, means for causing said valve members to move in unison and in the same direction upon increase of fluid pressure at either side of a piston, the movement of each valve member in one direction opening one of the bypasses for flow therethrough and movement of the valve member in the opposite direction opening the second bypass for flow therethrough, pipe lines connecting the opposite end portions of the valve casings, each pipe line leading from one end portion of a casing to the opposite end portion of the second casing, the points of communication of the pipe lines with each of the casings being at opposite sides of the valve member working in such casing.

2. In combination with a chassis, a front running gear, a rear running gear, and suspension springs interposed between the gears and the chassis; a hydraulic stabilizing system comprising a pair of front transversely spaced cylinders, pistons working therein, a pair of rear transversely spaced cylinders, pistons working in said rear cylinders, said pistons and cylinders being operatively engaged with the chassis and the running gears, a line connecting each pair of cylinders upon corresponding sides of the pistons, a second fluid line connecting each pair of cylinders at the opposite sides of the pistons, a valve casing interposed in the second-mentioned line connecting the cylinders of one pair, a valve casing in the first-mentioned line connecting the other pair of cylinders, each of said valve casings having two bypasses, a valve member in each of the casings normally in a position to close both of the bypasses against flow therethrough, means for causing said valve members to move in unison and in the same direction upon increase of fluid pressure at either side of a piston, the movement of each valve member in one direction opening one of the bypasses for flow therethrough and movement of the valve member in the opposite direction opening the second bypass for flow therethrough, pipe lines connecting the opposite end portions of the valve casings, each pipe line leading from one end portion of a casing to the opposite end portion of the second casing, the points of communication of the pipe lines with each of the casings being at opposite sides of the valve member working in such casing, a pipe line interposed between and in communication with the second-mentioned line connecting one pair of cylinders and the first-mentioned line connecting the other pair of cylinders, a casing interposed in said last named line, a pipe line leading from each of the lines connecting the first named valve casing and in separate communication with the last named casing, a valve member movable within the last named casing and normally closing the communication between said casing and the last named pipe lines, movement of the valve member in said last named casing in one direction opening the communication with one of the last named lines and movement in the opposite direction opening communication with the second of said last named lines, said last named casing having a bypass, flow through said last named bypass being materially restricted when the valve member in the last named casing is in its normal position.

3. In combination with a chassis, a front running gear, a rear running gear, and suspension springs interposed between the gears and the chassis; a hydraulic stabilizing system comprising a pair of front transversely spaced cylinders, pistons working therein, a pair of rear transversely spaced cylinders, pistons working in said rear cylinders, said pistons and cylinders being operatively engaged with the chassis and the running gears, a fluid line connecting each pair of cylinders upon corresponding sides of the pistons, a second line connecting each pair of cylinders at opposite sides of the pistons, a valve casing interposed in the second-mentioned line connecting the cylinders of one pair, a valve casing in the first-mentioned line connecting the other pair of cylinders, each of said valve casings having two bypasses, a valve member in each of the casings normally in a position to close both of the bypasses against flow therethrough, means for causing said valve members to move in unison and in the same direction upon increase of fluid pressure at either side of a piston, the movement of each valve member in one direction opening one of the bypasses for flow therethrough and movement of the valve member in the opposite direction opening the second bypass for flow therethrough, pipe lines connecting the opposite end portions of the valve casings, each pipe line leading from one end portion of a casing to the opposite end portion of the second casing, the points of communication of the pipe lines with each of the casings being at opposite sides of the valve member working in such casing, a pipe line interposed between and in communication with the second-mentioned line connecting one pair of cylinders and the first-mentioned line connecting the other pair of cylinders, a casing interposed in said last named line, a pipe line leading from each of the lines connecting the first named valve casing and in separate communication with the last named casing, a valve member movable within the last named casing and normally closing the communication between said casing and the last named pipe lines, movement of the valve member in said last named casing in one direction opening the communication with one of the last named lines and movement in the opposite direction opening communication with the second of said last named lines, said last named casing having a bypass, flow through said last named bypass being materially restricted when the valve member in the last named casing is in its normal position, the flow of fluid through the bypass in the last named casing increasing upon movement of the valve member within said casing in either direction.

4. In combination with a chassis, a front running gear, a rear running gear, and suspension springs interposed between the gears and the chassis, a hydraulic stabilizing system comprising a pair of front transversely spaced cylinders, pistons working therein, a pair of rear transversely spaced cylinders, pistons working in said rear cylinders, said pistons and cylinders being operatively engaged with the chassis and the running gears, a fluid line connecting each pair of cylinders upon corresponding sides of the pistons, a second line connecting each pair of cylinders at opposite sides of the pistons, a valve casing interposed in the second mentioned line connecting the cylinders of one pair, a valve casing in the second line connecting the other pair of cylinders, each of said valve casings having two bypasses, a valve member in each of the casings normally in a position to close both of the bypasses against flow therethrough, means for causing said valve members to move in unison and in the same direction upon increase of fluid pressure at either side of a piston, the movement of each valve member in one direction opening one of the bypasses for flow therethrough and movement of the valve member in the opposite direction opening the second bypass for flow therethrough, pipe lines connecting the opposite end portions of the valve casings, each pipe line leading from one end portion of a casing to the opposite end portion of the second casing, the points of communication of the pipe lines with each of the casings being at opposite sides of the valve member working in such casing, a pipe line interposed between and in communication with the second-mentioned line connecting one pair of cylinders and the first-mentioned line connecting the other pair of cylinders, a casing interposed in said last named line, a pipe line leading from each of the lines connecting the first named valve casing and in separate communication with the last named casing, a valve member movable within the last named casing and normally closing the communication between said casing and the last named pipe lines, movement of the valve member in said last named casing in one direction opening the communication with one of the last named lines and movement in the opposite direction opening communication with the second of said last named lines, said last named casing having a bypass, the central portion of the bypass in the last named casing being reduced, and a lip carried by the valve member in said last named casing coacting with the reduced portion of the bypass when said valve member is in its normal position to provide a restricted opening.

5. In combination with a chassis, a front running gear, a rear running gear, and suspension springs interposed between the gears and the chassis; a hydraulic stabilizing system comprising a pair of front transversely spaced cylinders, pistons working therein, a pair of rear transversely spaced cylinders, pistons working in said rear cylinders, said pistons and cylinders being operatively engaged with the chassis and the running gears, a line connecting each pair of cylinders upon corresponding sides of the pistons, a second fluid line connecting each pair of cylinders at the opposite sides of the pistons, a valve casing interposed in the second-mentioned line connecting the cylinders of one pair, a valve casing in the first-mentioned line connecting the other pair of cylinders, each of said valve casings having two bypasses, a valve member in each of the casings normally in a position to close both of the bypasses against flow therethrough, means for causing said valve members to move in unison and in the same direction upon increase of fluid pressure at either side of a piston, the movement of each valve member in one direction opening one of the bypasses for flow therethrough and movement of the valve member in the opposite direction opening the second bypass for flow therethrough.

6. In combination with a chassis, a front running gear, a rear running gear, and suspension springs interposed between the gears and the chassis; a hydraulic stabilizing system comprising a pair of front transversely spaced cylinders, pistons working therein, a pair of rear transversely spaced cylinders, pistons working in said rear cylinders, said pistons and cylinders being operatively engaged with the chassis and the running gears, a line connecting each pair of cylinders upon corresponding sides of the pistons, a second line connecting each pair of cylinders at the opposite sides of the pistons, a valve casing interposed in the second-mentioned line connecting the cylinders of one pair, a valve casing in the first-mentioned line connecting the other pair of cylinders, each of said valve casings having two bypasses, a valve member in each of the casings normally in a position to close both of the bypasses against flow therethrough, means for causing said valve members to move in unison and in the same direction upon increase of fluid pressure at either side of a piston, the movement of each valve member in one direction opening one of the bypasses for flow therethrough and movement of the valve member in the opposite direction opening the second bypass for flow therethrough, pipe lines connecting the opposite end portions of the valve casings, each pipe line leading from one end portion of a casing to the opposite end portion of the second casing, the points of communication of the pipe lines with each of the casings being at opposite sides of the valve member working in such casing, a pipe line interposed between and in communication with the second-mentioned line connecting one pair of cylinders and the first-mentioned line connecting the other pair of cylinders, a casing interposed in said last named line, a pipe line leading from each of the lines connecting the first named valve casing and in separate communication with the last named casing, a valve member movable within the last named casing and normally closing the communication between said casing and the last named pipe lines, movement of the valve member in said last named casing in one direction opening the communication with one of the last named lines and movement in the opposite direction opening communication with the second of said last named lines, said last named casing having a bypass, and resisting valves in the pipe line connecting the second and first-mentioned lines and at opposite sides of the casing interposed in such line connecting the rear and advance lines.

7. In combination with a chassis, a front running gear, a rear running gear, and suspension springs interposed between the gears and the chassis; a hydraulic stabilizing system comprising a pair of front transversely spaced cylinders, pistons working therein, a pair of rear transversely spaced cylinders, pistons working in said rear cylinders, said pistons and cylinders being operatively engaged with the chassis and the running gears, a fluid line connecting each pair of cylinders upon corresponding sides of the pistons, another line connecting each pair of cylinders at opposite sides of the pistons, a valve casing interposed in the second-mentioned line connecting the cylinders of one pair, a valve casing in the first-mentioned line connecting the second pair of cylinders, each of said valve casings having two bypasses, a valve member in each of the casings normally in a position to close both of the bypasses against flow therethrough, means for causing said valve members to move in unison and in the same direction upon increase of fluid pressure at either side of a piston, the movement of each valve member in one direction opening one of the bypasses for flow therethrough and movement of the valve member in the opposite direction opening the second bypass for flow therethrough, pipe lines connecting the opposite end portions of the valve casings, each pipe line leading from one end portion of a casing to the opposite end portion of the second casing, the points of communication of the pipe lines with each of the casings being at opposite sides of the valve member working in such casing, a pipe line interposed between and in communication with the second-mentioned line connecting one pair of cylinders and the first-mentioned line connecting the other pair of cylinders, a casing interposed in said last named line, a pipe line leading from each of the lines connecting the first named valve casing and in separate communication with the last named casing, a valve member movable within the last named casing and normally closing the communication between said casing and the last named pipe lines, movement of the valve member in said last named casing in one direction opening the communication with one of the last named lines and movement in the opposite direction opening communication with the second of said last named lines, said last named casing having a bypass, a pipe line leading from each of the lines connecting the two first named valve casings and in communication with the line connecting the second and first-mentioned lines and at opposite sides of the casing in said connecting line, and a non-return valve in each of said last named lines.

8. In combination with a chassis, a front running gear, a rear running gear, and suspension springs interposed between the gears and the chassis; a hydraulic stabilizing system comprising a pair of front transversely spaced cylinders, pistons working therein, a pair of rear transversely spaced cylinders, pistons working in said rear cylinders, said pistons and cylinders being operatively engaged with the chassis and the running gears, a fluid line connecting each pair of cylinders upon corresponding sides of the pistons, a second line connecting each pair of cylinders at opposite sides of the pistons, a valve casing interposed in the second-mentioned line connecting the cylinders of one pair, a valve casing in the first-mentioned line connecting the other pair of cylinders, each of said valve casings having two bypasses, a valve member in each of the casings normally in a position to close both of the bypasses against flow therethrough, means for causing said valve members to move in unison and in the same direction upon increase of fluid pressure at either side of a piston, the movement of each valve member in one direction opening one of the bypasses for flow therethrough and movement of the valve member in the opposite direction opening the second bypass for flow therethrough, pipe lines connecting the opposite end portions of the valve casings, each pipe line leading from one end portion of a casing to the opposite end portion of the second casing, the points of communication of the pipe lines with each of the casings being at opposite sides of the valve member working in such casing, a pipe line interposed between and in communication with the second-mentioned line connecting one pair of cylinders and the first-mentioned line connecting the other pair of cylinders, a casing interposed in said last named line, a pipe line leading from each of the lines connecting the first named valve casing and in separate communication with the last named casing, a valve member movable within the last named casing and normally closing the communication between said casing and the last named pipe lines, movement of the valve member in said last named casing in one direction opening the communication with one of the last named lines and movement in the opposite direction opening communication with the second of said last named lines, said last named casing having a bypass, a pipe line leading from each of the lines connecting the two first named valve casings and in communication with the line connecting the second and first-mentioned lines and at opposite sides of the casing in said connecting line, a non-return valve in each of said last named lines, and an additional valve interposed in one of said last named lines, said additional valve being so constructed and arranged as to open and close with the release or application of a braking system.

CARL A. TSCHANZ.